(12) United States Patent
van Wensen

(10) Patent No.: US 10,579,563 B2
(45) Date of Patent: Mar. 3, 2020

(54) MULTIPLE MASTER PROCESS CONTROLLERS USING A SHARED SERIAL PERIPHERAL BUS

(71) Applicant: HONEYWELL INTERNATIONAL INC., Morris Plains, NJ (US)

(72) Inventor: Aad van Wensen, Tilburg (NL)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/000,196

(22) Filed: Jun. 5, 2018

(65) Prior Publication Data

US 2018/0365184 A1 Dec. 20, 2018

Related U.S. Application Data

(60) Provisional application No. 62/520,925, filed on Jun. 16, 2017.

(51) Int. Cl.
*G06F 13/364* (2006.01)
*G06F 13/40* (2006.01)
*G06F 11/20* (2006.01)
*G06F 13/42* (2006.01)

(52) U.S. Cl.
CPC ........ *G06F 13/364* (2013.01); *G06F 11/2023* (2013.01); *G06F 13/4022* (2013.01); *G06F 13/4063* (2013.01); *G06F 13/4282* (2013.01); G06F 2201/805 (2013.01)

(58) Field of Classification Search
CPC ............... G06F 11/2023; G06F 13/364; G06F 13/4022; G06F 13/4063; G06F 13/4282; G06F 2201/805
See application file for complete search history.

(56) References Cited

U.S. PATENT DOCUMENTS

| | | | |
|---|---|---|---|
| 9,176,919 B2 | 11/2015 | Carney et al. | |
| 2003/0088743 A1* | 5/2003 | Rader | G06F 13/1684 711/148 |
| 2016/0034411 A1* | 2/2016 | Smith | G06F 13/4022 710/116 |
| 2016/0140067 A1* | 5/2016 | Gately | G06F 13/364 710/110 |
| 2018/0137079 A1* | 5/2018 | Lee | G06F 13/4282 |

\* cited by examiner

*Primary Examiner* — Eric T Oberly

(57) ABSTRACT

A fault-tolerant process control system includes a first and second master process controller, each including a first and second serial communication engine. A first bus switch couples the first serial communication engine to a shared SPI bus and a second bus switch couples the second communication engine to shared SPI bus. The shared SPI bus transmits SPI signals received from the first serial communication engine when the first bus switch is enabled to a first target device, and transmits SPI signals received from the second serial communication engine when the second bus switch is enabled to a second target device. An arbiter block receives a select control signal from the master process controllers and is coupled to both the first and second bus switch for single bus switch selection so that only one master process controller is granted access to the shared SPI bus.

16 Claims, 2 Drawing Sheets

MULTIPLE MASTER PROCESS CONTROLLERS USING A SHARED SERIAL PERIPHERAL BUS

CROSS REFERENCE TO RELATED APPLICATIONS

This application claims the benefit of Provisional Application Ser. No. 62/520,925 entitled "MULTIPLE MASTER PROCESS CONTROLLERS USING A SHARED SERIAL PERIPHERAL BUS", filed on Jun. 16, 2017, which is herein incorporated by reference in its entirety.

FIELD

Disclosed embodiments relate to fault-tolerant process control systems having a master process controller and a secondary master controller, along with Serial Peripheral Bus communication interfaces that enable communications between the process controllers and for a plurality of field devices to be controlled.

BACKGROUND

The failure of an industrial control system can lead to costly downtime. There is expense involved in restarting a process along with the actual production losses resulting from a failure. If the process is designed to operate without supervisory or service personnel, all of the components in the process control system generally need to be fault-tolerant.

A conventional way of providing fault-tolerance is by including a Safety Instrumented System (SIS) hooked up in parallel to the process control system. Accordingly, a fault-tolerant process control system generally includes a first and a second master controller. The Serial Peripheral Interface (SPI) bus is a commonly used microprocessor data bus for process control systems. SPI as known in the art is designed for a single master process controller with multiple slave controllers, and thus does not support redundant master controllers. SPI is a fully synchronous serial protocol, so that for every clock cycle one bit of data is transferred.

FIG. 1 is a block schematic diagram of a conventional fault-tolerant process control system 100 comprising a primary master process controller 110 interfaced to a plurality of input/output (IO) modules 120 shown as IO modules $120_1 \ldots 120n$, and another (redundant) master process controller 110' interfaced to a plurality of input/output (IO) modules 120' shown as IO modules $120_1' \ldots 120n'$. The IO modules 120, 120' are shown coupled to field devices comprising sensors 112 and actuators 113 that are coupled to processing equipment 114 to allow sensing and control of the process being run in industrial processing facility (IPF) that is fault-tolerant process controlled by the master process controllers 110, 110'. The connection between the master process controllers 110 and 110' shown as 119 is a known connection that enables their respective memories comprising the first memory 111a and second memory 111a' to be tracked memories. This arrangement allows the memories 111a and 111a' to be maintained in an identical fashion using an initial memory transfer followed by updates that are tracked.

Master process controllers 110 and 110' each include a processor 111, 111' shown as a central processing unit (CPU) having internal memory 111a, 111a' (e.g., register memory), and a serial communication engine 117, 117'. A first Serial Peripheral Interface (SPI) bus 135 is shown with its logic signals that provide a synchronous serial data link which operates in full duplex mode which is between the master process controller 110 and the IO modules $120_1 \ldots 120n$. A second SPI bus 135' is shown with its logic signals that provides a synchronous serial data link that operates in full duplex mode between the master process controller 110' and the IO modules $120_1' \ldots 120n'$. Each of the IO modules $120_1 \ldots 120n$ and $120_1' \ldots 120n'$ has an SPI port.

SPI specifies four logic signals. These logic signals are (i) CLK (serial clock) output from controller/master (controller); (ii) MOSI: controller/master output, IO module/slave input (output from controller/master); (iii) MISO; controller/master input, IO module/slave output (output from slave); and (iv) separate/independent IO module/slave select signals (active low, output from controller/master) shown as MS1, MSn.

The IO modules in 120 comprising IO modules $120_1 \ldots 120n$, and in 120' comprising IO modules $120_1' \ldots 120n'$ are connected in a daisy chain configuration where the SPI signals (CLK, MOSI and MISO) of the respective IO modules for each process controller can be seen to all be connected together. Respective IO modules 120, 120' communicate in slave mode where the master process controller 110, 110' acting as the master device forms the messages to be sent to the slave device in its memory 111a, 111a' to initiate data frames to form a multi-frame message.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include fault-tolerant process control systems that have 2 or more redundant master process controllers (e.g., programmable logic controllers (PLCs)) that each access respect target devices (e.g., IO modules) through a single shared SPI bus. A disclosed fault-tolerant process control system includes a first master process controller including a first processor including first memory and a first serial communication engine, and at least a second master process controller connected in parallel to the first master process controller including a second processor including second memory and a second serial communication engine.

A first bus switch couples the first serial communication engine to a shared SPI bus, and a second bus switch couples the second serial communication engine to the shared SPI bus. The shared SPI bus transmits SPI signals received from the first serial communication engine when the first bus switch is enabled to at least a first target device, and transmits SPI signals received from the second serial communication engine when the second bus switch is enabled to at least a second target device. An arbiter block has inputs coupled to receive a select control signal from both of the master process controllers. The outputs of the arbiter block are coupled to the first bus switch and to the second bus switch for single bus switch selection so that at any time only one of the master process controllers is granted access to the shared SPI bus.

Disclosed arrangements thus solve the problem for conventional fault-tolerant process control systems, such as the conventional fault-tolerant process control system 100 shown in FIG. 1, where a single random hardware failure in either of the master process controllers prevents the remaining 'healthy' master process controller from gaining access to the SPI bus and thus controlling the process resulting in plant down-time. This disclosed arrangement also removes the need for conventional fully redundant first and second SPI buses 135, 135' as shown in FIG. 1 that thus reduces the cost of the fault-tolerant process control system.

DETAILED DESCRIPTION

Figure 1:
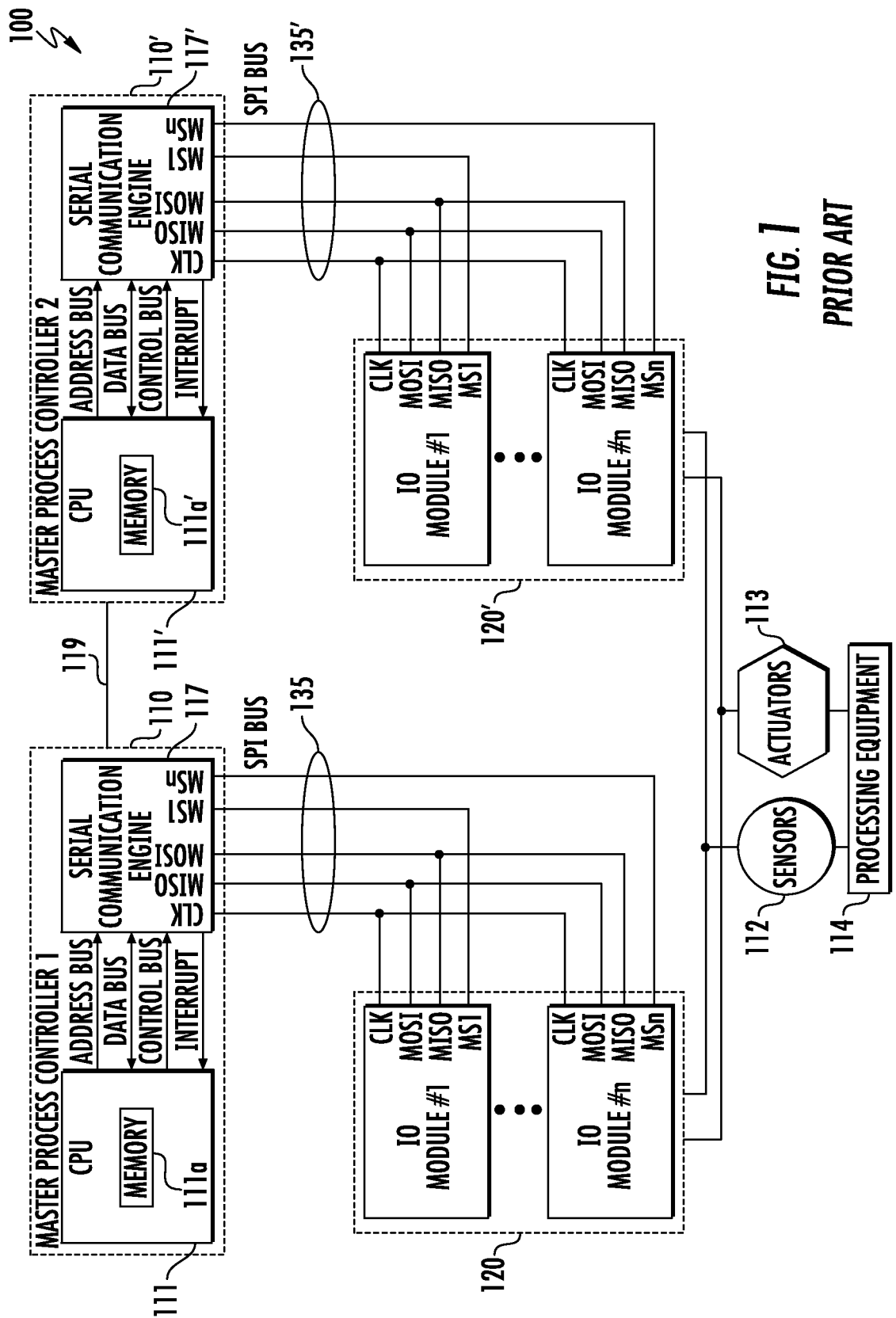
FIG. 1 is block schematic diagram of a conventional fault tolerant control system comprising a first master process controller interfaced to a plurality of IO modules, and a second master process controller interfaced to another plurality of IO modules, where the respective process controllers are each connected to separate SPI busses.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 2:
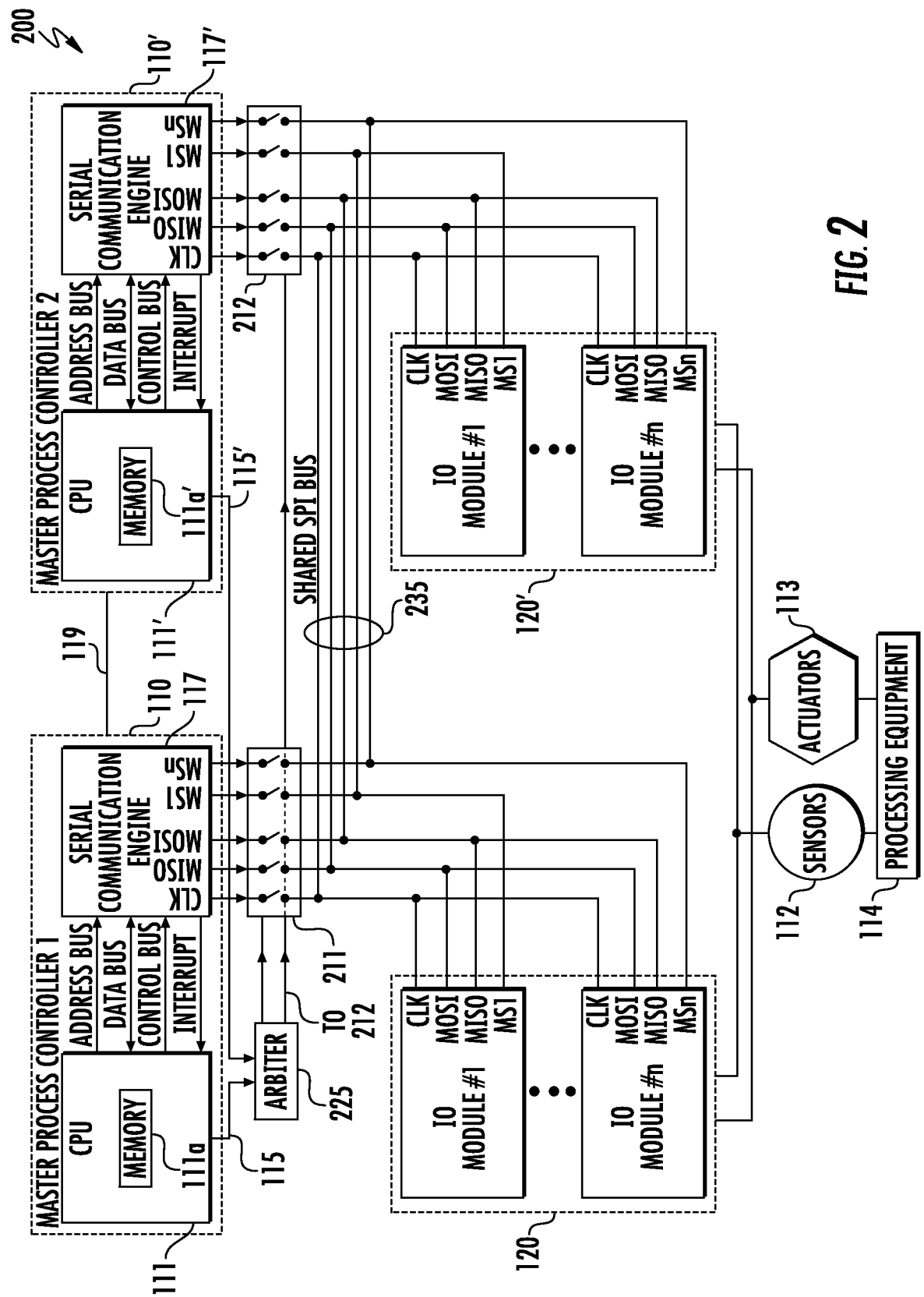
FIG. 2 is a block schematic diagram of a disclosed fault-tolerant process control system including redundant master controllers comprising a first master process controller shown as Master process controller 1 and a second master process controller shown as Master process controller 2, where both of the master process controllers are connected to the same shared SPI bus through respective bus switches that are controlled to be On one at a time by an arbiter to a common node for each of the SPI lines (MISO, MOSI, CLK, CS), according to an example embodiment.

FIG. 2 shows a disclosed fault-tolerant process control system 200 including a first process controller shown as master process controller 1 110 and a redundant second master process controller shown as master process controller 2 110'. The processor controllers can each comprise a PLC. Each master process controller 110, 110' connects to the same shared SPI bus 235 through a dedicated bus switch 211, 212, sometimes also called "digital switches", which as known in the art are electronic products designed for connecting to high speed digital buses. The basic element for each channel of a bus switch is generally an N-Channel field effect transistor (FET) whose condition (on, or off) is controlled by Complementary Metal-Oxide Semiconductor (CMOS) logic that controls the bias voltage applied to the FET gate with respect to a source terminal for NMOS or to a drain terminal for PMOS. The switches may also comprise bipolar transistors or insulated-gate bipolar transistors (IGBTs).

Both of the bus switches 211, 212 are controlled by an arbiter block 225 that controls the bus switches for single bus switch selection such that only one of the bus switches 211, 212 at any given time will have its switches On to thus allow connecting to its associated master process controller to the shared SPI bus 235. The arbiter block 225 can comprise digital logic such as flip-flops with logic functions, analog logic, or be software-based.

The arbiter block 225 is controlled by signals sent over the request lines 115, 115' provided by the respective master processor controllers 110, 110'. More generally, N-number of master controllers can be connected to the shared SPI bus 235 with an arbiter block 225 providing outputs to a dedicated data bus switch for each master controller. As noted above, the connection between the master process controllers 110, 110' shown as connection 119 is a known connection that is configured to enable their respective first memory 111a, and second memory 111a' to be tracked memories. The first memory 111a and the second memory 111a' can comprise register memory or other memory.

The first master process controller 1 110 includes a first processor 111 shown as a CPU including first memory 111a and a first serial communication engine 117 and the second master process controller 2 110' connected in parallel to the first master process controller includes a second processor 111' shown as a CPU including a second memory 111a' and a second serial communication engine 117'. The processors 111, 111' can comprise a digital signal processor (DSP), a microcontroller, an application specific integrated circuit (ASIC), a general processor, or any other combination of one or more integrated processing devices.

A first bus switch 211 couples the first serial communication engine 117 to the shared SPI bus 235 including a plurality of SPI lines, and a second bus switch 212 that couples the second serial communication engine 117' to the same shared SPI bus 235. The shared SPI bus 235 transmits SPI signals received from the first serial communication engine 117 when the first bus switch 211 is enabled by the arbiter block 225 to at least a first target device 120 shown as IO module 1 to IO module n, and transmits SPI signals received from the second serial communication engine 117' when the second bus switch 212 is enabled to at least a second target device 120' shown as IO module 1' to IO module n'.

Both master process controllers 110/110' are thus connected to the same shared SPI bus 235 through respective bus switches 211, 212 to a common node (shown in FIG. 2 as black dots at the intersection of a plurality of lines) for each of the SPI bus lines (MISO, MOSI, CLK, CS). The bus switches 211, 212 can generally comprise any analog or tri-state switch capable of driving or level shifting the SPI signal levels and frequencies (typically to 16 MHz) used in the process control system for implementing process control.

The target devices 120 and 120' are shown both coupling to the same sensors shown as sensor 112 and the same actuators shown as actuator 113, that both are associated with processing equipment 114 such as boilers, tanks and mixers which run a physical (industrial or manufacturing) process that generates a tangible product. Although the target devices 120 and 120' are both described as IO modules and shown as IO modules in FIG. 2 being part of a fault-tolerant process control system 200, the devices connected to the shared SPI bus 235 in other system types may be any controller such as a PLC using SPI as communication bus that can benefit from disclosed multiple master process controllers utilizing a shared single SPI bus that can comprise any slave device compatible with an SPI bus.

The arbiter block 225 will generally activate the most recently requested bus switch through control by master process controller signaling over request lines 115, 115', and release (i.e., turn Off) all other data bus switch(es) even while the other data bus switches are switched On. A master process controller will not request the SPI bus 235 if one of the other master process controllers is incapable of sensing a request over a request line for releasing the shared SPI bus 235. A healthy master process controller can sense another master controller is incapable of sensing a request by generally exchanging status messages between the master controllers over connection 119. This assures that a single hardware fault cannot block access of healthy master process controller(s) to shared SPI bus 235. The arbiter block 225 can also assure that if multiple master process controllers (master process controller 1 110 and master process controller 2 110' in FIG. 2) request the shared SPI bus 235 simultaneously, only one of the master process controllers 110, 110' will gain access to the shared SPI bus 235. The master process controller which will gain access to the shared SPI bus 235 in this simultaneous case can be arbitrarily set (e.g., arbitrarily master process controller 110) or be based on some parameter, such as based on the best quality. For example, a fault-free master process controller may take preference over a master process controller with current fault(s), were a fault can be anything abnormal.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A fault-tolerant process control system, comprising:
a first master process controller including a first processor including first memory and a first serial communication engine;
at least a second master process controller connected in parallel to said first master process controller including a second processor including second memory and a second serial communication engine;
a first bus switch coupling said first serial communication engine to a shared Serial Peripheral Interface (SPI) bus including a plurality of SPI lines and a second bus switch coupling said second serial communication engine to said shared SPI bus, wherein said shared SPI bus transmits SPI signals received from said first serial communication engine when said first bus switch is enabled to at least a first target device, and transmits SPI signals received from said second serial communication engine when said second bus switch is enabled to at least a second target device, and
an arbiter block having an input coupled to receive a select control signal from both said first and second master process controllers that is coupled to both said first bus switch and to said second bus switch for single bus switch selection,
wherein at any time only one of said first master process controller and said second master process controller is granted access to said shared SPI bus, and
wherein in an event that said first master process controller and said second master process controller request said shared SPI bus simultaneously, said arbiter block is arranged to allow only at least one of said first and second master process controllers to take preference over the other master process controller based on best quality parameters, allowing only the fault free master process controller to gain access to said shared SPI bus.

2. The fault-tolerant process control system of claim 1, wherein said first processor and said second processor each comprise a programmable logic controller (PLC).

3. The fault-tolerant process control system of claim 1, wherein said first target device and said second target device each comprise a plurality of input/output (IO) modules that are both coupled to field devices including sensors and actuators which are coupled to processing equipment in an industrial processing facility (IPF).

4. The fault-tolerant process control system of claim 1, wherein said arbiter block comprises digital logic.

5. The fault-tolerant process control system of claim 1, wherein said arbiter block comprises analog logic.

6. The fault-tolerant process control system of claim 1, wherein said first bus switch and said second bus switch comprise analog switches or tri-state switches.

7. The fault-tolerant process control system of claim 1, wherein said first memory and said second memory both comprise register memory.

8. A method of process control, comprising:
providing a first master process controller including a first processor including first memory and a first serial communication engine and at least a second master process controller connected in parallel to said first master process controller including a second processor including second memory and a second serial communication engine, with a first bus switch coupling said first serial communication engine to a shared Serial Peripheral Interface (SPI) bus including a plurality of SPI lines and a second bus switch coupling said second serial communication engine to said shared SPI bus, and an arbiter block having an input coupled to control said first bus switch and said second bus switch;
said shared SPI bus transmitting SPI signals received from said first serial communication engine when said first bus switch is enabled to a first target device and transmitting SPI signals received from said second serial communication engine when said second bus switch is enabled to a second target device;
said arbiter block receiving a select control signal from said both said first and second master process controllers for single bus switch selection so that at any time only one of said first master process controller and said second master process controller is granted access to said shared SPI bus,
wherein in an event that said first master process controller and said second master process controller request said shared SPI bus simultaneously, said arbiter block is arranged to allow only at least one of said first and second master process controllers to take preference over the other master process controller based on best quality parameters, allowing only the fault free master process controller to gain access to said shared SPI bus.

9. The method of claim 8, wherein said first target device and said second target device each comprise input/output (IO) modules that are both coupled to field devices including sensors and actuators which are coupled to processing equipment.

10. The method of claim 8, wherein said first processor and said second processor each both comprise a programmable logic controller (PLC).

11. The method of claim 8, wherein said arbiter block comprises digital logic.

12. The method of claim 8, wherein said arbiter block comprises analog logic.

13. The method of claim 8, wherein said arbiter block is software-based.

14. The method of claim 8, wherein said first bus switch and said second bus switch comprise analog switches or tri-state switches.

15. The method of claim 8, wherein said first memory and said second memory comprise register memory.

16. The method of claim 8, wherein said arbiter block activates a most recently requested one said first and second bus switch through a control signal sent by said first or by said second master process controller.

* * * * *